United States Patent Office 2,961,311
Patented Nov. 22, 1960

2,961,311
METAL ION CONTROL

Frederick C. Bersworth, East Orange, N.J., and Arthur E. Martell, Northboro, Mass., assignors to The Dow Chemical Company, Midland, Mich., a corporation of Delaware No Drawing. Filed Dec. 13, 1955, Ser. No. 552,714

5 Claims. (Cl. 71—1)

This application is a continuation in part of our copending application Serial No. 322,577, filed November 25, 1952, now abandoned, entitled Metal Ion Control.

This invention relates to a method of controlling metal ion concentration in media at predetermined low concentrations while simultaneously controlling pH in those media and to compositions useful for carrying out the method.

In many phases of chemical endeavor, control of hydrogen ion concentration and control of metal ion concentration, or simultaneous control of both, is of basic necessity to the succesful accomplishment of the process being carried out. Common methods in the past have been to employ typical buffer systems, which include mixtures of carbonates, bi-carbonates or phosphates, but these are of little utility in circumstances where it is necessary to control metal ion concentration, because the buffers themselves react with the metal ion. In many industrial applications, such as the growth of micro-organisms for the production of such materials as penicillin, the growth of yeast in fermentation and other micro-biological operations, which include the preparation of some vitamins, the control of metal ion concentration in the growing medium is of considerable importance, because the organism being cultivated requires some metals in its metabolism in trace amounts. Where it is not possible accurately to control the concentration of metal ion in the growing medium, deviations in the quality and character of the product result.

In many biological reactions other than those involving the growth of micro-organisms, metal ions are involved and, in order to study these reactions under conditions which will give reproducible results, it is necessary to maintain the hydrogen ion and metal ion at a constant concentration. Thus it becomes necessary not only to buffer the hydrogen ion but also to buffer the metal ion so that its concentration will not alter appreciably as it is used in the reaction.

It is accordingly a fundamental object of this invention to provide a composition useful for forming a metal buffer system for controlling metal ion concentrations at low levels so that the system is rendered insensitive to changes which utilize the metal ion.

It is another object of the invention to provide a composition useful for adjusting the hydrogen ion concentration and metal ion concentration of a culture medium for micro-organisms.

It is another object of the invention to provide a composition useful for controlling and maintaining constant the concentration of metal ions in chemical reaction media.

Other objects and advantages of the invention will in part be obvious and will in part appear hereinafter.

The invention, accordingly, is embodied in a composition based upon the discovery that compounds conforming to the following general formula:

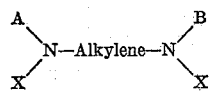

where alkylene is one of the group —$CH_2CH_2$—, —$CH(CH_3)CH_2$—, and —$CH_2CH_2CH_2$—; X is one of the group —$CH_2COOH$, —$CH_2CH_2COOH$; A is of the group X, hydrogen, alkyl, alkoxy, aralkyl and sulfhydryl groups and such groups carrying substituents such as carboxyl, ester, hydroxyl, phosphonic, sulfonic acids and the like; the effect of the functional substituents is merely to modify the precise level of metal ion concentration and pH attained; B is one of the group A and X; wherein $n$ being the total number of replaceable hydrogen atoms, the compounds used are $n-2$ and $n-1$ alkali metal salts, may be used in combination with metal chelates thereof to develop compositions having metal ion reservoirs and pH reservoirs characterized by their stability with respect to developing a given level of hydrogen ion and metal ion concentration and maintaining it. Metal in complex form is put in solution in a useful concentration which provides a large reservoir of ionic metal in micro amounts as needed and as used in the process occurring in the medium. In compounds of this class of chelating agents, $n$ is the total number of replaceable hydrogens in the presence of the metal chelate itself. The alkali metals are, of course, sodium, potassium, lithium, rubidium and caesium.

In accordance with the present invention, a new kind of system is provided wherein difficulties in pH and metal ion control are overcome, for both the pH and metal ion concentrations are maintained substantially constant even in the presence of changing conditions, such as interference with the system caused by the growth and respiration of living organisms, absorption of carbon dioxide from the atmosphere and the like. Systems prepared with chelating agents of the general formula given above will develop stable metal ion concentration simultaneously with stable hydrogen ion concentration. Broadly, the invention consists in preparing a solution containing a given number of parts of the mono- and di-acid alkali metal salts of the chelating agent and adding thereto the metal chelate of that same compound with the result that there is produced a buffered solution of stable pH and metal ion concentration value for a given amount of material. The solution will have a micro concentration of metal ions in a reservoir of metal in complex non-ionized form together with ionized and ionizable complexing agent as a pH reservoir.

In accordance with the present invention, a mixture of the metal complex and an alkali metal salt of ethylene diamine tetraacetic acid is used for maximum buffering capacity and most efficient maintenance of the metal ion concentration at the constant composition. The alkali metal salt may be considered to be the one having from 2 to 3 alkali metal atoms in its composition and is effectively present in solution in optimum form when an equimolar mixture of the di- and tri-sodium salts of the chelating agent are used. Equal molar mixtures of the three components may be used, and where these equal molar amounts of the di- and tri-sodium salts of the given fundamental amino compound corresponding to the formula above are used, the following equilibria are believed to be established.

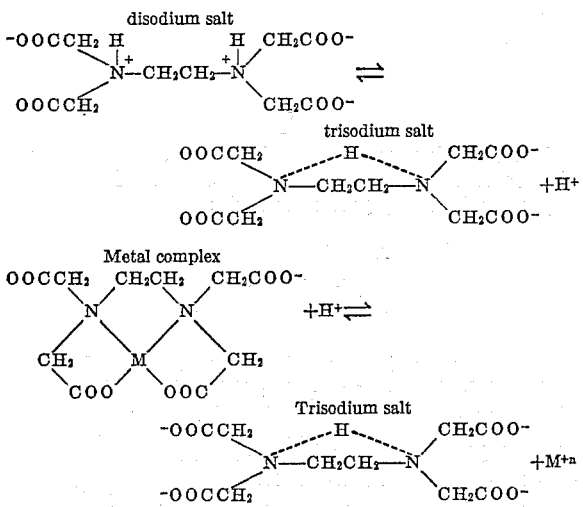

Accordingly, any process which utilizes the metal ion which was in the complex and is in equilibrium with the complex in the system, produces a displacement of both equilibria, the metal ion being largely replaced by further disassociation of the metal complex while the slight change in the concentration of the complexing composition produces in turn a slight change in the pH. However, the concentration of both the free hydrogen ions and the free metal ions is low and proportionately large amounts of these may be involved without producing substantial changes in the metal complex and complexing agent concentration. Since these constituents are not materially changed, they effectively regulate pH and metal ion concentration essentially at the same level. The solution, therefore, may be said to be effectively buffered with respect to the hydrogen and metal ions.

While, as indicated, the preferred embodiment of the invention involves preparing a solution employing equal molar amounts of the three ingredients going into the equilibrium, it is to be understood that variations of the ratio may be carried out with only minor loss in effectiveness of the solution in developing appropriate metal ion and pH control. That is, the pH level and metal ion level may be altered by varying the proportions of di- and tri-sodium salts and metal chelates used.

In general it may be said that the invention is embodied in a method, a reaction bath, and composition for metal-buffering, by means of which hydrogen ions and metal ions may be controlled at a low, known concentration, which control is not affected by utilization of the metal ion. In other words, the maintenance of the metal ion concentration at a constant low level is independent of processes, such as enzyme activity respiration or metabolism, which may use up over a period of time many times the amount of free metal in the system at the maintained concentration. The practice of the invention thus provides a reservoir for metal ions, supplying them as needed at a predetermined level of concentration.

By the practice of this invention, many metal ions, that is, essentially all polyvalent ions, particularly those having a divalent state, including those of magnesium, calcium, strontium, barium, manganese, ferrous iron, ferric iron, cobaltous cobalt, nickel, copper, zinc, cadmium, lead, rare earths, and transuranic metals, may be effectively controlled or "buffered" at known, low concentration.

In carrying out the invention, the constituents are preferably employed in the ratio of about 1 mole of preformed metal complex, 1 to 2 moles of di-alkali salt of the complexing agent, and 2 moles to 1 mole of tri-alkali salt of the complexing agent. The preferred molar ratio of metal complex to complexing agents is 1:1:1 as an optimum representing a proportion giving maximum buffering capacity on either side of the starting level. The actual ratio may be varied to 1:1:4 to 1:4:1 to 4:1:1 while keeping the pH stable within 0.1–.5 pH unit in the range from pH 5 to pH 10.

As presently preferred, these three constituents are advantageously employed in the ratio of one molar part of each, but the actual total amount of these constituents employed in the reaction bath ordinarily need not be more than a small fraction of a molar concentration of the reaction bath. However, to provide an effective amount of metal and also to maintain effective control over a useful period of time in the reaction medium, concentration of the order of 0.001 molar and higher are used.

The invention will now be specifically disclosed in connection with a series of examples showing its application to a variety of metal ions with a variety of chelating agents corresponding to the formula given.

The structural formula of the di-sodium salt of ethylene diamine tetraacetic acid in ionic form may be illustrated as follows:

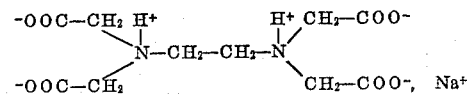

The structural formula of the tri-sodium salt of ethylene diamine tetraacetic acid in ionic form may be illustrated as follows:

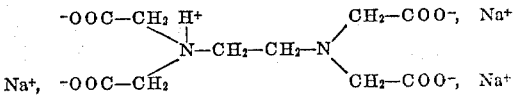

The structural formula of the calcium complex or chelate formed from the tetra sodium salt of ethylene diamine tetraacetic acid may be illustrated as follows:

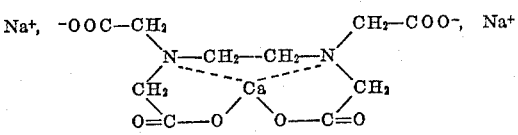

In practicing the invention, the three constituents mentioned above may be added separately to the reaction bath in the proportions stated above, they may be added in the form of a previously prepared solution, or they may be incorporated into the reaction bath in the form of previously prepared tablets.

*Example I*

Thus, with equimolar proportions of di-sodium salt of ethylene diamine tetraacetic acid, tri-sodium salt of ethylene diamine tetraacetic acid, and ethylene diamine tetraacetic acid sodium salt calcium complex, each in a concentration of 0.001 gram-mole per liter, the pH of the resulting solution was 6.6, and the gram-equivalent per liter of free calcium ion was $10^{-6.9}$. After utilization of one-third of the calcium, the pH of the reaction bath was 6.3, and the gram-equivalent per liter of free calcium ion was $10^{-6.8}$. After utilization of two-thirds of the calcium, the pH of the reaction bath was 6.1, and the gram-equivalent per liter of free calcium ion was $10^{-6.9}$. It will be observed that the concentration of calcium ions remained relatively constant throughout, and that the pH of the solution remained reasonably uniform.

With variation in the proportions of di-sodium salt of ethylene diamine tetraacetic acid, tri-sodium salt of ethylene diamine tetraacetic acid, and the calcium complex formed from the tetrasodium salt of ethylene diamine tetraacetic acid, the concentration of calcium ion, and the pH, were maintained substantially constant, although at slightly different levels.

Example II

With di-sodium salt of ethylene diamine tetraacetic acid at a concentration of 0.002 gram-mole per liter, namely, twice that given in Example I, and with tri-sodium salt of ethylene diamine tetraacetic acid and ethylene diamine tetraacetic acid sodium salt calcium complex each at a concentration of 0.001 gram-mole per liter, the pH of the resulting solution was 6.1, and the gram-equivalent per liter of calcium ion was $10^{-6.4}$. After utilization of one-third of the calcium ion, the figures for pH and calcium ion concentration were respectively 6.0 and $10^{-6.5}$. After utilization of two-thirds of the calcium ion, the pH of the solution and the concentration of calcium ion were 5.9 and $10^{-6.7}$ respectively.

Example III

With tri-sodium salt of ethylene diamine tetraacetic acid at a concentration of 0.002 gram-mole per liter, and with di-sodium salt of ethylene diamine tetraacetic acid and ethylene diamine tetraacetic acid sodium salt calcium complex each at a concentration of 0.001 gram-mole per liter, the pH of the solution and the concentration of calcium ion were 6.9 and $10^{-7.5}$ respectively. After utilization of one-third of the calcium ion, the figures for pH and calcium ion concentration were 6.6 and $10^{-7.4}$ respectively; and after utilization of two-thirds of the calcium ion, these figures were, respectively, 6.4 and $10^{-7.5}$.

The application of the principles of the invention to the control of magnesium ions likewise may be illustrated. It will be noted, however, that the concentration of magnesium ion in terms of gram-equivalents per liter is maintained at a somewhat lower level, for corresponding pH's, than is the case with calcium ions.

Example IV

Thus, under conditions comparable with those described above in connection with calcium ion, and with equi-molar parts of di-sodium salt of ethylene diamine tetraacetic acid, tri-sodium salt of ethylene diamine tetraacetic acid, and ethylene diamine tetraacetic acid sodium salt magnesium complex, each in a concentration of 0.001 gram-mole per liter, the pH of the resulting solution was 6.6, but the gram-equivalent per liter of magnesium ion was $10^{-5.2}$. After utilization of one-third of the magnesium, the pH of the bath was 6.3, and the concentration of magnesium ion in gram-equivalent per liter was $10^{-5.1}$. After utilization of two-thirds of the magnesium, the pH of the bath was 6.1, and the concentration of magnesium ion was $10^{-5.2}$.

Example V

Continuing with the magnesium ion illustrations, with di-sodium salt of ethylene diamine tetraacetic acid at a concentration of 0.002 gram-mole per liter, and with tri-sodium salt of ethylene diamine tetraacetic acid and ethylene diamine tetraacetic acid sodium salt magnesium complex each at a concentration of 0.001 gram-mole per liter, the pH of the solution was 6.1, and the concentration of magnesium ion $10^{-4.7}$; after utilization of one-third of the magnesium ion, pH was 6.0 and magnesium ion concentration $10^{-4.8}$; after utilization of two-thirds of the magnesium ion, the pH of the solution was 5.9 and magnesium ion concentration $10^{-5.0}$.

Example VI

Further continuing with the magnesium ion illustrations, with tri-sodium salt of ethylene diamine tetraacetic acid at a concentration of 0.002 gram-mole per liter, and with di-sodium salt of ethylene diamine tetraacetic acid and ethylene diamine tetraacetic acid sodium salt magnesium complex each at a concentration of 0.001 gram-mole per liter, the pH of the solution was 6.9 and the concentration of magnesium ion was $10^{-5.8}$ gram-equivalent per liter; after utilization of one-third of the magnesium ion, the pH was 6.6 and the magnesium ion concentration $10^{-6.7}$; after utilization of two-thirds of the magnesium ion, the solution pH was 6.4 and the magnesium ion concentration $10^{-5.8}$.

In the case of ferrous iron ($Fe^{II}$), the ionic concentration, at pH's corresponding to those illustrated above, is maintained at levels somewhat higher than in the case of calcium and magnesium.

Example VII

With equimolar parts of di-sodium salt of ethylene diamine tetraacetic acid, tri-sodium salt of ethylene diamine tetraacetic acid, and ethylene diamine tetraacetic acid sodium salt ferrous iron ($Fe^{II}$), complex, each in a concentration of 0.001 gram-mole per liter, the pH of the bath was 6.6, and the concentration of $Fe^{II}$ ion in gram-equivalents per liter was $10^{-10.9}$; after utilization of one-third of the $Fe^{II}$ ion, the solution pH was 6.3 and the $Fe^{II}$ concentration was $10^{-10.8}$; and after utilization of two-thirds of the $Fe^{II}$ ion, the pH of the bath was 6.1 and the concentration of $Fe^{II}$ ion was $10^{-10.9}$.

Example VIII

With di-sodium salt of ethylene diamine tetraacetic acid at a concentration of 0.002 gram-mole per liter, and with tri-sodium salt of ethylene diamine tetraacetic acid sodium salt $Fe^{II}$ complex each at a concentration of 0.001 gram-mole per liter, the solution pH was 6.1 and the $Fe^{II}$ ion concentration was $10^{-10.4}$; after utilization of one-third of the $Fe^{II}$ ion, the solution pH was 6.0 and the $Fe^{II}$ ion concentration $10^{-10.5}$; and after utilization of two-thirds of the $Fe^{II}$ ion, the pH of the solution was 5.9 and the concentration of the $Fe^{II}$ ion was $10^{-10.7}$ gram-equivalent per liter.

Example IX

Further continuing with the illustration of $Fe^{II}$ ion control, with tri-sodium salt of ethylene diamine tetraacetic acid at a concentration of 0.002 gram-mole per liter, and with di-sodium salt of ethylene diamine tetraacetic acid and ethylene diamine tetraacetic acid sodium salt ferrous iron ($Fe^{II}$) complex each at a concentration of 0.001 gram-mole per liter, the pH of the solution was 6.9 and the concentration of $Fe^{II}$ ion was $10^{-11.5}$ gram-equivalent per liter; after utilization of one-third of the $Fe^{II}$ ion, the pH of the solution was 6.6 and the $Fe^{II}$ ion concentration was $10^{-11.4}$; and after utilization of two-thirds of the $Fe^{II}$ ion, the pH of the bath was 6.4 and the concentration of $Fe^{II}$ ion was $10^{-11.5}$.

Example X

In a 0.16 molar aqueous solution of sodium chloride at 25° C., and with equimolar proportions of di-sodium salt of ethylene diamine tetraacetic acid, tri-sodium salt of ethylene diamine tetraacetic acid, and ethylene diamine tetraacetic acid sodium complex of the metal under consideration being present, the latter three each in a concentration of 0.001 gram-mole per liter, the pH of the bath in each case being 6.3, the concentration of the metal ion was as given in the following table:

| Metal Ion | Valence of Metal Ion | Concentration of Metal Ion in Gram-Equivalents per Liter |
|---|---|---|
| Calcium (Ca) | +2 | $10^{-6.5}$ |
| Magnesium (Mg) | +2 | $10^{-5.1}$ |
| Strontium (Sr) | +2 | $10^{-5.0}$ |
| Barium (Ba) | +2 | $10^{-4.2}$ |
| Zinc (Zn) | +2 | $10^{-13.0}$ |
| Ferrous Iron (Fe) | +2 | $10^{-10.8}$ |
| Cuprous Copper (Cu) | +2 | $10^{-15.2}$ |
| Ferric Iron (Fe) | +3 | $10^{-21.4}$ |

It will be observed that under corresponding conditions, the ion concentration at which ferric iron is main-

Example XI

Dihydroxyethyl ethylene diamine diacetic acid, believed to have the following structure:

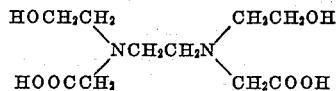

was used to make up a solution containing 1:1:1 molar ratios of mono and di-sodium salts and the metal chelate. The metal ions listed below were buffered to give the following concentrations and the pH was stabilized at 4.8:

| Metal: | Concentration of metal in molarity of free metal ion |
|---|---|
| $Cu+2$ | $2\times10^{-8}$ |
| $Ni+2$ | $2\times10^{-8}$ |
| $Co+2$ | $3\times10^{-7}$ |
| $Zn+2$ | $5\times10^{-7}$ |
| $Cd+2$ | $1\times10^{-6}$ |

Example XII

Monobutylethylene diamine triacetic acid

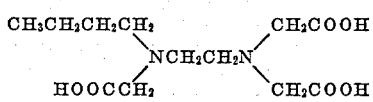

was used to make up a solution containing 1:1:1 molar ratios of mono and di-sodium salts and the copper chelate. The copper ion was buffered to give a concentration of $3\times10^{-10}$ molar and the pH was stabilized at 6.7.

Example XIII

Monobenzylethylene diamine triacetic acid

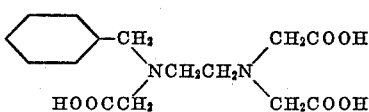

was used to make up a solution containing 1:1:1 molar ratios of mono and di-sodium salts and the copper chelate. The copper ion was buffered to give a concentration of $5\times10^{-9}$ molar and the pH was stabilized at 5.2.

Example XIV

Ethylene diamine, N,N'-diacetic acid

was used to make up a solution containing 1:1:1 molar ratios of mono and di-sodium salts and the copper and zinc chelates. The metal ions were buffered to give approximately the following concentrations and the pH was stabilized at 6.4:

| Metal: | Concentration—molarity of free metal ion |
|---|---|
| $Cu+2$ | $1\times10^{-13}$ |
| $Zn+2$ | $1\times10^{-8}$ |
| $Cd+2$ | $2\times10^{-6}$ |

Example XV

Diethylethylene diamine-N,N'-diacetic acid

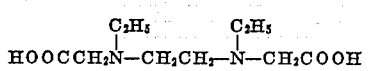

was used to make up a solution containing 1:1:1 molar ratios of mono and di-sodium salts and the metal chelates. The metal ion was buffered to give approximately the following concentrations and the pH was stabilized at 6.5:

| Metal: | Concentration—molarity of metal ion |
|---|---|
| $Ni+2$ | $5\times10^{-11}$ |
| $Co+2$ | $1\times10^{-8}$ |

Example XVI

Ethylene diamine diacetic-N,N'-dipropionic acid

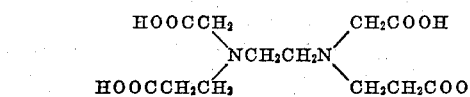

was used to make up a solution containing 1:1:1 molar ratios of mono and di-sodium salts and the metal chelates. The metal ion was buffered to give approximately the following concentrations and the pH was stabilized at 6.0:

| Metal: | Concentration—molarity of metal ion |
|---|---|
| $Cu+2$ | $3\times10^{-13}$ |
| $Co+2$ | $1\times10^{-11}$ |
| $Pb+2$ | $4\times10^{-10}$ |
| $Cd+2$ | $1\times10^{-8}$ |

Example XVII

Ethylene diamine-N,N'-dipropionic acid

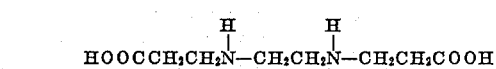

was used to make up a solution containing 1:1:1 molar ratios of mono and di-sodium salts and the metal chelates. The metal ion was buffered to give approximately the following concentrations and the pH was stabilized at 6.9:

| Metal: | Concentration—molarity of metal ion |
|---|---|
| $Cu+2$ | $4\times10^{-13}$ |
| $Ni+2$ | $3\times10^{-7}$ |
| $Zn+2$ | $1\times10^{-5}$ |

Example XVIII

Monobutylethylene diamine-N,N'-dipropionic acid

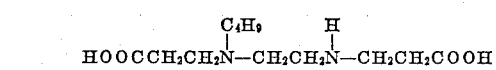

was used to make up a solution containing 1:1:1 molar ratios of mono and di-sodium salts and the metal chelates. The metal ion was buffered to give approximately the following concentrations and the pH was stabilized at 7.0:

| Metal: | Concentration—molarity of metal ion |
|---|---|
| $Co+2$ | $1\times10^{-5}$ |
| $Fe+2$ | $4\times10^{-4}$ |

Example XIX

Ethylene diamine tetrapropionic acid

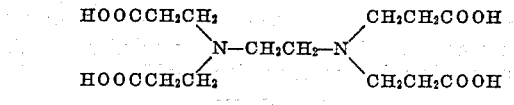

was used to make up a solution containing 1:1:1 molar ratios of mono and di-sodium salts and the metal chelates. The metal ions were buffered to give approximately the following concentrations and the pH was stabilized at 6.8:

| Metal: | Concentration—molarity of metal ion |
|---|---|
| $Ni+2$ | $1\times10^{-7}$ |
| $Zn+2$ | $1\times10^{-5}$ |
| $Co+2$ | $1\times10^{-5}$ |

Example XX

Trimethylene diamine tetraacetic acid

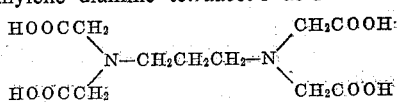

was used to make up a solution containing 1:1:1 molar ratios of mono- and di-sodium salts and the metal chelates. The metal ions were buffered to give approximately the following concentrations and the pH was stabilized at 7.9:

| Metal: | Concentration—molarity of metal ion |
|---|---|
| $Ca+2$ | $8 \times 10^{-8}$ |
| $Mg+2$ | $1 \times 10^{-6}$ |

Example XXI

Propylene diamine tetraacetic acid

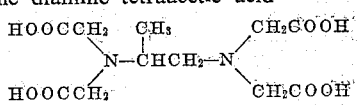

was used to make up a solution containing 1:1:1 molar ratios of mono and di-sodium salts and the metal chelates. The metal ions were buffered to give approximately the following concentrations and the pH was stabilized at 6.3:

| Metal: | Concentration—molarity of metal ion |
|---|---|
| $Cu+2$ | $7 \times 10^{-19}$ |
| $Pb+2$ | $1 \times 10^{-18}$ |
| $Zn+2$ | $1 \times 10^{-16}$ |

The variety of examples given will illustrate clearly that pH and metal ion concentrations may be stabilized and controlled simultaneously in aqueous and salt reaction media. It is also possible to alter the pH and metal ion concentrations in nutrient media for the growth of micro-organisms. Where a particular micro-organism requires trace amounts of one metal or a combination of metals the compositions herein described make possible the maintenance of a desirable amount of the metal or combination of metals in their medium. Where combination of metals is called for by the micro-organisms, the two chelates formed by the two metals are combined in appropriate proportion to give a total combined metal ion concentration needed and di- and tri-sodium salts of the chelating agent are mixed therewith in amounts to give substantially the required pH.

Example X lists eight metals which can be maintained in solution at a given concentration. Any combination of two or more of these metals can be maintained in solution at the concentration indicated by taking the metal chelate and using the same excess of chelating agents described to maintain the pH of the solution. For example, to maintain two metals in combination at a specified concentration in a medium, a composition would be prepared containing one part of the chelate of the metal, one part of the chelate of the second metal to be maintained in combination therewith, one part of each of the di- and tri- salts of the chelating agents which affect the pH of the solution, that is, the same excess of the pH controlling factor, namely the chelating agents, is used for maintaining any combination of metals at a concentration as would be used for maintaining a single metal at a given concentration.

Inasmuch as the variety of media in which various organisms grow will range from agar gels to soils which are found in all parts of the country through compositions like distillery mashes and carbohydrate formulations, it is obvious that specific numerical examples cannot be given. Where the problem involves the adjustment of the pH of the soil and the addition of traces of metals, the compositions described can be used for such controls. For example, in the control of iron chlorosis, iron chelates of the ferrous or ferric form of the metal in very low concentration may be added to the soil or sprayed onto the tree suffering from this defect and may be cured. It appears that the controlled supply of a trace of iron satisfies the need of the plant. The adjustment of the pH of the particular optimal medium to be used can be accomplished readily by addition of the compositions which have been described and variations of those compositions.

Just as the compositions may be used for adding traces of metal to various solid and semi-solid media, they may also be used for addition of traces of metal to solutions used in the hydroponic technique of cultivating plants. The saline solutions used in the examples given correspond to physiological salt solutions.

Results have been reported on the utilization of iron chelates in plant nutrition. In such systems it is desirable to alter the iron chelate composition incorporated into the growing medium so that the iron reservoir represented by the iron chelate will provide iron to the medium regulated to an optimum pH for keeping the iron in solution for absorption by the plant. Whatever the mechanism of utilization of iron by a plant, it can be assumed that the iron must be in solution. Hence, application of iron chelate under pH conditions approaching the alkaline range, wherein even the low trace of ionic iron provided by the iron chelate is sufficient to precipitate iron hydroxide does not represent control of iron concentration.

For example, in a report appearing in "Plant Physiology," April 1951, by Jacobson, a description of experiments is given in which the iron chelate of ethylenediamine tetraacetic acid was used in nutrient Hoagland solutions for the growth of plants. It is pointed out that the pH was not controlled and rose from initial value of 5.5 to a final value of 7.5 or 8.

Similar experiments conducted with a composition containing the iron reservoir as the iron chelate in the blend of two chelating agent salts, as described herein, to provide a pH reservoir, as in Examples VI–X gives an optimum utilization of the iron because, first, the iron is present in a concentration of 55 p.p.m. parts per million as opposed to the lower concentration reported by Jacobson; secondly, the higher concentration of the iron chelate utilizable in accordance with these examples maintains a level of iron ($Fe^{II}$ or $Fe^{III}$) ions in solution at a pH useful to the plant, which pH is held constant to within a fraction of one unit as opposed to the uncontrolled variation in pH encountered by Jacobson in his utilization of materials at a lower level of concentration. It is possible at these higher concentrations of iron to grow plants in the medium without damage to the plant.

It is also possible in the specific application of the information in Examples XV–XIX to utilize the sodium cobalt ethylenediaminetetraacetate as a source of cobalt for blood and vitamin B–12 production in plant and animal nutrition.

The sodium cobaltic ethylenediaminetetraacetate has the following formula

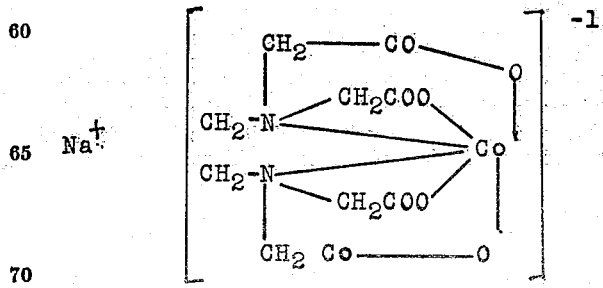

and has been reported by Brintzinger. It is a crystalline solid product and consists of deep red-violet to violet crystals, which are generally formed as the tetra hydrate. It is very soluble in water and forms an intensely violet colored solution. The potassium and ammonium salts of the cobalt chelate have also been reported and have properties similar to the sodium salt.

Since it is known that cobalt salts are effective in stimulating blood production and are necessary precursors for the production of vitamin B-12 (see: U.S. Pat. 2,595,499, May 6, 1952, Wood and Handlin, assigned to Merck & Co.) and also as micro nutrients in plant nutrition and in bacteria growth (see: Hutner et al., Proc. Assn. Phil. Society, 94, No. 2, April 1950) the utilization of cobalt in systems where it is necessary to the ultimate result is indicated. For example, in fermentation operations for the preparation of vitamin B-12 as described in U.S. Patent 2,595,499 where cobalt nitrate is used in small amounts as the source of cobalt, stabilization of the pH of the nutrient medium while maintaining available a useful concentration of cobalt ions is achieved through addition to the system of a composition prepared in accordance with Examples XV-XIX.

The cobalt chelates are useful in such operations and have advantages over the inorganic salts of cobalt, because they are metabolically stable are much less toxic than the inorganic salts of cobalt and they permit a slow but definite useful release of ionic cobalt so that they act as cobalt reservoirs. In addition, the compounds are chemically very stable, easily crystallizable in definite compositions in pure form, and, therefore, susceptible to accurate quantitative control.

The chemical and metabolic stability of sodium cobaltic ethylenediaminetetraacetate coupled with its slight disassociation and low toxicity compared to the inorganic cobalt make this material useful in any media where the cobalt ion is desirable, for example media for preparation of vitamin B-12, as in U.S. Patent 2,595,499. Frequently in such fermentation reactions, pH is neglected because in conventional operations it is not controllable and the growth is merely allowed to go as far as it will with natural change in pH, which ultimately induces a reduced level of growth activity. Incorporation of cobalt as the cobalt chelate of ethylenediaminetetraacetic acid with the chelating agents in accordance with Example XV makes possible the growth of the organism with increased vitamin B-12 production due to the extension of the useful life of the culture medium.

In application to animal nutrition, cobalt deficiency of animals is noted with one or more of the following symptoms, depraved appetite, rough hair coat, gauntness, and thin blood in poor supply. The addition of the cobalt compounds with the pH control medium, as in Examples XV-XVI, as a drench or as a pasture top dressing eliminate this deficiency. Also, the incorporation of the cobalt chelates with the alkali metal pH reservoir into feeds and drinking water can supply the animals with a relatively innocuous form of cobalt. Similarly, the compositions described in Examples XV-XIX may be added to fertilizer where the great stability of the cobalt chelate will prevent any rearranging or displacement by other metals present in the soil. In hydroponics such as the Hoagland solution, pH control is directly achieved because there is no precipitation of cobalt or iron despite the fact that precipitating anions are present in the nutrient solution.

Having described the invention with a series of numerical examples indicating the manner in which a variety of metals may be maintained at a controlled concentration in a medium at a prsecribed pH, it is to be understood that the application of the compositions to control the pH and metal ion concentrations in other media may be made without departing from the spirit or scope of the invention.

What is claimed is:

1. The method of maintaining and controlling metal ion and hydrogen ion concentration simultaneously at a predetermined level to maintain pH within about 0.5 unit of starting level in a menstruum in the pH range from 5 to about 10, which comprises adding to said menstruum a composition consisting of a mixture of two alkali metal salts of a chelating agent and a preformed metal complex of said chelating agent, the chelating agent having the following general formula:

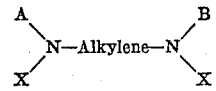

where alkylene is one of the group $-CH_2CH_2-$, $-CH(CH_3)CH_2-$, and $-CH_2CH_2CH_2-$; X is one of the group $-CH_2COOH$, $-CH_2CH_2COOH$; A is one of the group X, hydrogen, alkyl, hydroxyalkyl, aralkyl and sulfhydryl groups and substituted groups of this class; B is one of the group A and X; the alkali metal salts used are alkali metal salts in which one and two acid hydrogens are present, and the metal of said complex is that whose concentration is to be controlled and maintained in said menstrumm, the molar ratios of the salts and metal complex being in the range 1:1:4 to 1:4:1 to 4:1:1, the concentration of metal complex being at least about 0.001 molar.

2. The method in accordance with claim 1, in which the menstruum is a microbiological growing medium and the metal chelate is a cobaltic chelate.

3. The method in accordance with claim 2 in which the cobalt chelate is the sodium salt of cobaltic ethylenediaminetetraacetic acid and the chelating agents are the di- and tri-sodium salts of ethylenediamine tetraacetic acid, all being present in 1:1:1 molar ratio.

4. The method in accordance with claim 1 in which the menstruum is a plant growing medium and the metal chelate is an iron chelate.

5. The method in accordance with claim 4 in which the iron chelate is the sodium salt of ferric ethylene-diaminetetraacetic acid and the chelating agents are the di- and tri-sodium salts of ethylenediamine tetraacetic acid, all being present in 1:1:1 molar ratio.

References Cited in the file of this patent

UNITED STATES PATENTS

| 2,656,347 | Goett et al. | Oct. 20, 1953 |
| 2,734,018 | Minieri et al. | Feb. 7, 1956 |
| 2,763,591 | Hatch et al. | Feb. 18, 1956 |
| 2,844,515 | Sobotka | July 22, 1958 |

OTHER REFERENCES

Plant Physiology, April 1951, pp. 411 to 413.
Agricultural Chemicals, July 1952, pp. 36 to 48.
Martell et al: Chemistry of the Metal Chelate Compounds, 1952, publ. by Prentice Hall, Inc. (Englewood Cliffs, N.J.), pp. 471 to 473, 479, 499 to 512.
Chemical and Engineering News (C&EN), Nov. 19, 1956, page 5753.